United States Patent [19]

Bardl et al.

[11] Patent Number: 4,695,804

[45] Date of Patent: Sep. 22, 1987

[54] APPARATUS FOR GENERATING A MULTI-FREQUENCY SIGNAL

[75] Inventors: Artur Bardl, Munich; Manfred Lindner, Unterhaching, both of Fed. Rep. of Germany

[73] Assignee: Siemens Aktiengesellschaft, Berlin and Munich, Fed. Rep. of Germany

[21] Appl. No.: 761,056

[22] Filed: Jul. 31, 1985

[30] Foreign Application Priority Data

Aug. 3, 1984 [DE] Fed. Rep. of Germany ....... 3428767

[51] Int. Cl.[4] ........................ H03L 7/18; H03B 21/00
[52] U.S. Cl. ..................................... 328/14; 328/143; 328/61; 328/62; 307/529
[58] Field of Search .................... 328/14, 142, 143, 61, 328/62; 307/529; 340/347 DA

[56] References Cited

U.S. PATENT DOCUMENTS

| | | | |
|---|---|---|---|
| 3,657,657 | 4/1972 | Jefferson | 328/14 |
| 3,820,028 | 6/1974 | Thomas | 328/14 |
| 3,838,414 | 9/1974 | Wiles | 340/347 DA |
| 4,053,839 | 10/1977 | Knoedl | 328/14 |
| 4,058,805 | 11/1977 | Lake | 340/347 DA |
| 4,068,178 | 1/1978 | Tunzi | 328/14 |
| 4,404,430 | 9/1983 | Ogita | 328/14 |
| 4,446,436 | 5/1984 | Ireland | 328/14 |
| 4,504,741 | 3/1985 | Armitage | 328/14 |

FOREIGN PATENT DOCUMENTS 2513040  3/1983  France .

OTHER PUBLICATIONS

Electronic Components and Application, vol. 1, No. 1, Oct. 1978, "Two-Tone Telephone Dialing", by Gebo-ers et al, pp. 29-40.
"PLA" Handbook, 3rd Edition, pp. 1-4 to 1-15 of the Firm Monolithic Memories, Inc.

Primary Examiner—John S. Heyman
Attorney, Agent, or Firm—Herbert L. Lerner; Laurence A. Greenberg

[57] ABSTRACT

An appartus for generating a multi-frequency signal includes a D/A converter, two converter circuits connected to the D/A converter for determining a respective connecting instant, two controlled waveform counters each being connected to a respective one of the converter circuits, a D/A cycle control connected to the converter circuits for monitoring the converter circuits, a sample-and-hold circuit having divider capacitors and being connected to the D/A converter, and holding capacitors connected to the sample-and-hold circuit.

5 Claims, 4 Drawing Figures

APPARATUS FOR GENERATING A MULTI-FREQUENCY SIGNAL

The invention relates to an apparatus for generating a multi-frequency signal, including a D/A converter addressed by a controlled waveform counter.

In telecommunications technology, the multi-frequency method is used to process signaling information generated in a subscriber station. Several sine waves are generated there as a function of row and column signals of the keyboard and are subsequently summed up.

One prior art method consists of constructing two digital/analog converters wherein each generates one of the two required frequencies. The circuits must also mix the two frequencies having different levels and must make the sum signal available for signaling. In a book by Eugene R. Hnatec entitled: "User's Guidebook To Digital CMOS Integrated Circuits", 1981, McGraw-Hill, page 185, a circuit suitable for such a purpose and for use in a telephone set is described. The circuit includes a reference oscillator having an output signal which is fed to two parallel sine wave counters under the control of the signaling keyboard. The counters generate two pulse currents, through which two D/A converters are driven. The output signals thereof are combined in an operational amplifier, and the output of the amplifier supplies a multi-frequency signal. Pages 173 to 176 of the publication describe an apparatus in which signals derived from the key matrix are fed to two dividers which drive a D/A converter and which determine the weighting ratios for an upper and a lower frequency group. The two generated sine waves are added and can then be taken off at an output driver.

It is accordingly an object of the invention to provide an apparatus for generating a multi-frequency signal, which overcomes the hereinafore-mentioned disadvantages of the heretofore-known devices of this general type, and in which the frequency generation is carried out in a simple manner, while making different levels and mixing available.

With the foregoing and other objects in view there is provided, in accordance with the invention, an apparatus for generating a multi-frequency signal, comprising a D/A converter, two coordinating circuits connected to the D/A converter for determining a respective connecting instant, two controlled waveform counters each being connected to a respective one of the coordinating circuits for addressing the D/A converter, a D/A cycle control connected to the coordinating circuits for monitoring the coordinating circuits, a sample-and-hold circuit having divider capacitors and being connected downstream of the D/A converter, and holding capacitors connected to the sample-and-hold circuit.

In accordance with another feature of the invention, the D/A converter includes switched capacitors forming a voltage divider with the divider capacitors of the sample-and-hold circuit.

In accordance with a further feature of the invention, the divider capacitors have different capacities.

In accordance with a concomitant feature of the invention, the holding capacitors can be connected through the D/A cycle control, in dependence on the counters.

The invention permits the synthesis of several frequencies having different levels with only one D/A converter. The apparatus is characterized by a highly reproducible accuracy of the levels, since the same converter is used for the different frequencies. The staircase voltages are likewise generated by only a single switched capacitor device which serves as D/A converter. The different amplitudes for the individual frequencies are generated by a capacitive voltage division between the D/A converter and divider capacitors of different magnitude, which are constructed as sample-and-hold circuits and are connected at the instant of conversion when an analog value for the corresponding frequency is generated. These capacitors store the analog staircase function, the amplitude value of which already has the final value.

Other features which are considered as characteristic for the invention are set forth in the appended claims.

Although the invention is illustrated and described herein as embodied in an apparatus for generating a multi-frequency signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
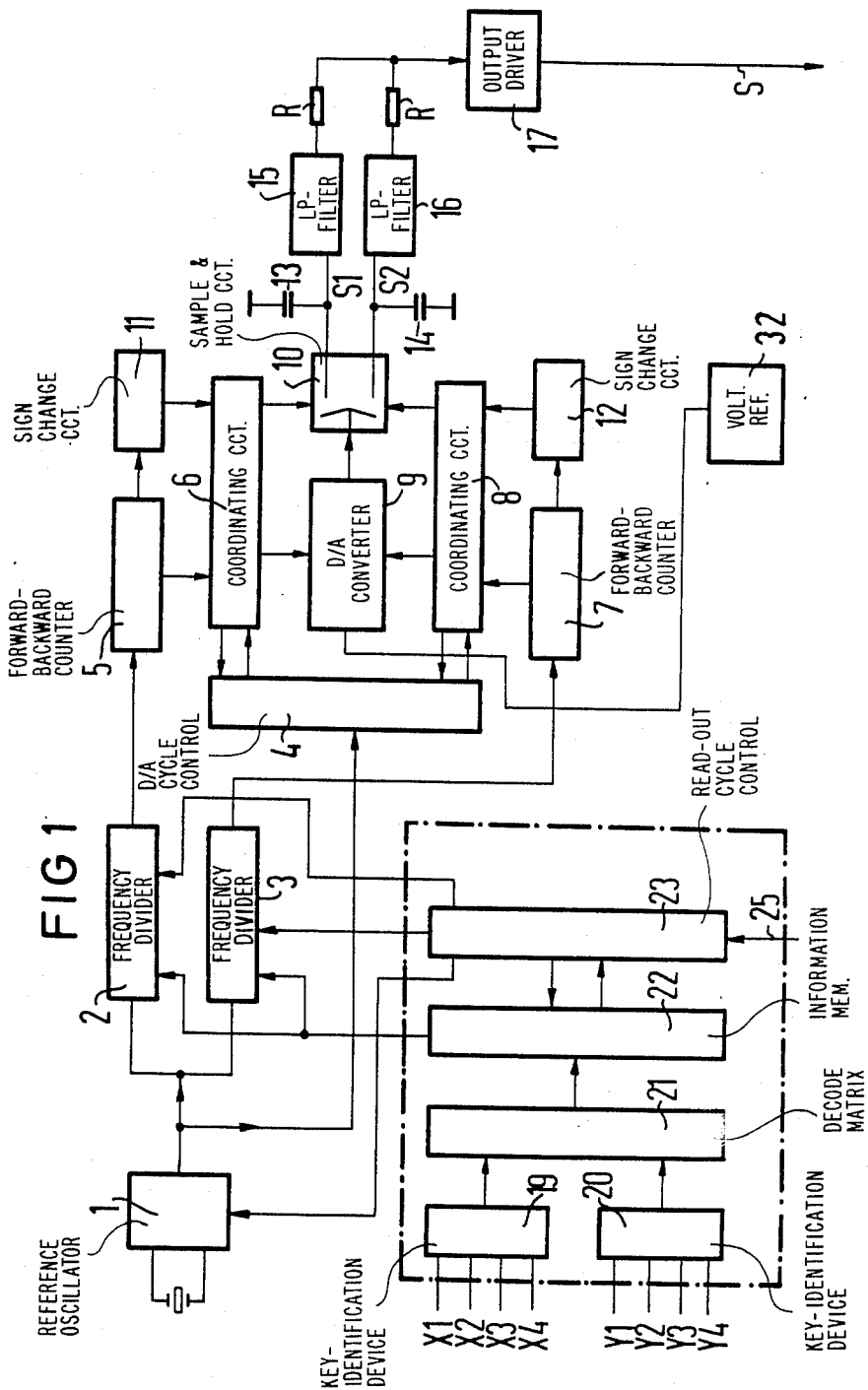
FIG. 1 is a block circuit diagram of the invention.
Figure 2:
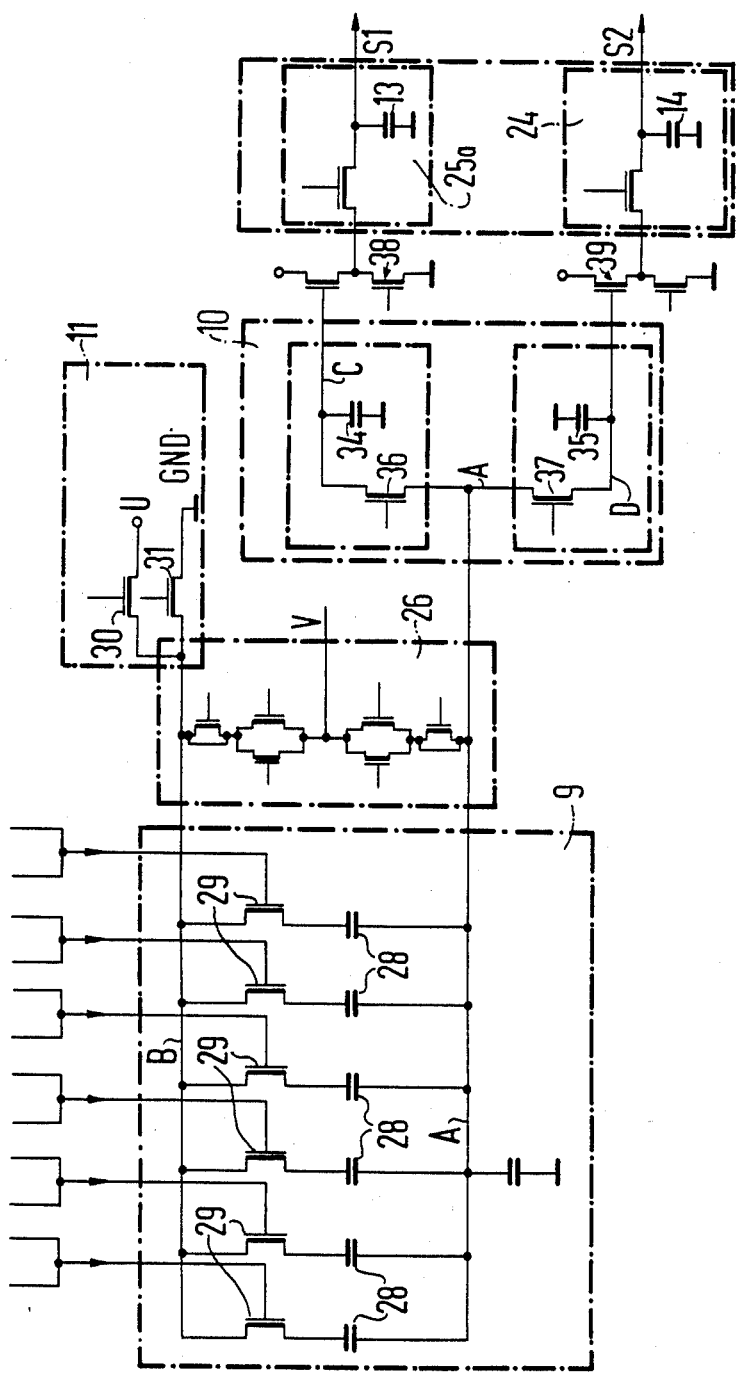
FIG. 2 is a schematic circuit diagram showing details of FIG. 1.

The embodiment of the apparatus shown in FIGS. 1 and 2 serves for generating an upper and a lower frequency group with four different frequencies each. Starting from a reference oscillator 1, forward/backward counters 5, 7 (waveform counters) are addressed by a first divider 2 for the upper frequency group and a second divider 3 for the lower frequency group. The outputs of the counters are each connected to a signchange circuit 11, 12, respectively, and to a D/A converter circuit 6, 8, respectively. Connected between the two circuits 6, 8 is a capacitive D/A converter 9 which is supplied by reference voltage source 32 and is weighted sinusoidally, as well as a sample-and-hold circuit 10 driven by the converter 9. The circuit 10 has one output for each of the upper and lower frequency groups, which is conducted through a respective low-pass filter 15, 16, to an output driver 17. The A/D conversion is controlled by a D/A cycle control 4. The two dividers 2, 3 are programmed by an information memory 22 and a readout cycle control 23, which in turn can be driven by a key identification device 19, 20 and a decoder matrix 21. The first key identification device 19 is fed by row lines X1 to X4 coming from a keyboard of the subscriber set and the second key identification 20 device is fed by corresponding column lines Y1 to Y4.

The operation of the apparatus will be described below. The cradle function of the telephone device is monitored by a line 25'. As soon as there is an indication that it is set in operation, the oscillator 1 is started by the readout cycle control 23 for supplying the D/A converter control 4 and the key identification. The two key identification devices 19, 20 ascertain if the keyboard has been operated. If this is the case, the X and Y signals associated with the key in question are passed on to the decoder matrix 21. The decoder matrix 21 addresses the information memory 22, in which the key information assigned to the key is stored at the corresponding address. The divider ratios are derived therefrom through decoding. The two dividers 2, 3 are thereupon programmed and started by the readout cycle control 23.

The A/D conversion proper is based on the intention to generate a waveform having a staircase shape. The width of the steps is determined in this case by the associated divider 2 or 3, respectively, and the height of the steps is determined by the associated forward/backward counters 5 and 7. In the illustrated embodiment, a quarter-folding of the sinusoidal staircase function is also provided. This principle is described in conjunction with FIGS. 2 and 3.

By means of the control signals fed to the coordinating circuits 6, 8, the converter cycle control 4 checks if and possibly when, a simultaneous conversion for the upper frequency group can be carried out and it coordinates the connection to the D/A converter 9. The coordinating circuits 6, 8 in this case fulfill a multiplexer function for the D/A converter 9. Because of the multiple utilization of the D/A converter 9, if simultaneous conversion is required, a timing error is produced since the conversion cannot take place at the correct time. This error is corrected by using storage times of different lengths between the conversion and passing on of the signal in the sample-and-hold member 10 by divider capacitors 34, 35 to hold capacitors 13, 14. The true time relationship can be derived from the digital frequency dividers 2 and 3 for each generated frequency. Two counters are required for the simultaneous synthesis of two frequencies, for instance.

The sine signal of the upper frequency group and the sine signal of the lower frequency group are fed to the first and second low-pass filter 15, 16, respectively, for filtering out harmonics. The two signals are mixed in the output driver 17 connected thereto.

FIG. 2 shows an embodiment illustrating details of the sinusoidally weighted D/A converter 9, a reset circuit 26 connected thereto, the sign change circuit 11, the sample-and-hold circuit 10, and circuits 25, 24 for time compensation in each of the two branches.

Figure 3:
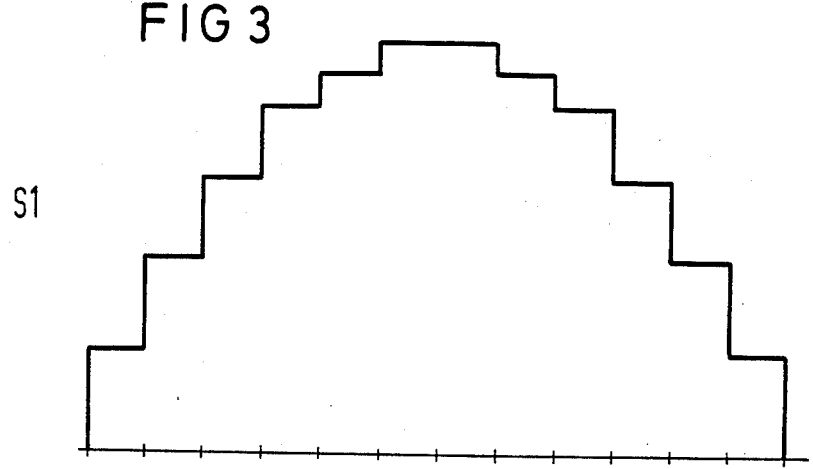
FIGS. 3 and 4 are graphs showing waveforms in conjunction with the apparatus according to FIGS. 1 and 2, respectively.

In order to generate the 12-step amplitude function shown in FIG. 3, the D/A converter 9 is formed of six weighted capacitors 28 with a transistor 29 for connecting each to two reference voltages U, GND which are connected by transistors 30, 31 in dependence on the sign of the sine half-waves to be generated.

For each of the frequency groups, the sample-and-hold circuit 10 is formed of a divider capacitor 34 or 35, respectively, and a connection (transistor 36 or 37, respectively).

The cycle phases of the D/A conversion will be described below. Initially, the nodes A, B, C or D are reset. At the same time, the transistors 36 and 37 are switched into conduction. All of the transistors or switches 29 which are required in the following conversion phase are closed. At the end of the rest phase, the nodes A, B, C and D are at zero.

The first quarter of a sinusoidal staircase function is generated by providing that the transistor or switch 30 connects the node B to one reference voltage source. The respective voltage value at the node A is stored in the capacitors 34 and 35, respectively. As soon as all of the switches 29 are connected, i.e. if the forward/backward counter 5 or 7, respectively, has reached its final state, the capacitors 28 are successively switched off again by the switches 29 when counting backward. In this manner, the second quarter of the sine function is generated. Similarly, the sine wave is completed through a connection to the second reference voltage source through the transistors or switches 31. The different amplitude for the individual frequencies are generated by the capacitive voltage division among the capacitors 28 and 34 or 35, respectively.

However, the D/A conversion for a frequency related to the staircase steps is not uninterrupted and successive; rather, switching is performed between the individual staircase steps from one frequency group to the other frequency group. As already described, this is accomplished by the D/A converter connections or coordinating circuits 6, 8 for the switches 29 and by the converter cycle control 4 for the switches 36, 37.

The partial voltages respectively stored in the divider capacitors 34, 35 are connected to the circuits 25a, 24 through impedance transformers 38 and 39, respectively.

FIG. 3 shows the positive half-wave of a 12-stage amplitude function S1. Such a function can be taken off in principle at the output of the circuits 25 and 24.

Figure 4:
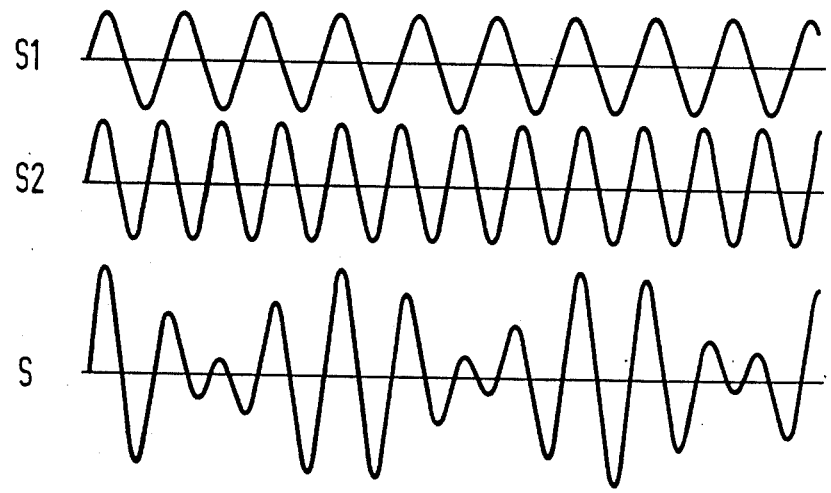

Neglecting the staircases function, the waveforms of two sine waves S1, S2 are plotted in FIG. 4 as they can be taken off at the outputs of the circuits 25 and 24, for instance. The waveform below S1 and S2 in FIG. 4 is a multi-frequency signal S generated by mixing the two sine signals.

The cycle control 4 and the readout cycle control 23 can be provided, for instance, as a PLA (Programmable Logical Array), the structure of which is known from the company publication "PLA Handbook, 3rd Edition, pages 1-4 to 1-15, of the firm Monolithic Memories, Inc.

We claim:

1. Apparatus for generating a multi-frequency signal, comprising a digital-to-analog converter, two coordinating circuits connected to said D/A converter for providing different frequency analog-wave information to said D/A converter for determining a respective connecting instant, two forward/backward counters driven by different frequencies each being connected for controlling a respective one of said coordinating circuits, a D/A cycle control connected to said coordinating circuits for monitoring time connecting instants of said converter circuits to said D/A converter, a sample-and-hold circuit having at least two divider capacitors and being connected to said D/A converter controlled by said D/A cycle control, and holding capacitors connected to said sample-and-hold circuit, whereby at least two different frequency analog waves are generated.

2. Apparatus according to claim 1, wherein said D/A converter includes switched weighted capacitors forming a voltage divider with said divider capacitors of said sample-and-hold circuit.

3. Apparatus according to claim 1, wherein said divider capacitors have different capacities.

4. Apparatus according to claim 2, wherein said divider capacitors have different capacities.

5. Apparatus according to claim 1, including a frequency divider for each frequency for driving a respective forward/backward counter, wherein said holding capacitors can be connected through said D/A cycle control, in dependence on frequency dividers.

* * * * *